(12) United States Patent
Oh et al.

(10) Patent No.: US 8,399,046 B2
(45) Date of Patent: Mar. 19, 2013

(54) PREPARATION METHOD OF METAL OXIDE DOPED MONOLITH CARBON AEROGEL FOR CAPACITANCE CAPACITOR

(75) Inventors: Young Joo Oh, Seoul (KR); Jung Rag Yoon, Yongin-si (KR); In Kyu Song, Seoul (KR); Jong Heop Yi, Seoul (KR); Yoon Jae Lee, Bucheon-si (KR); Ji Chul Jung, Seoul (KR)

(73) Assignee: Samhwa Capacitor Co., Ltd. (KR)

( * ) Notice: Subject to any disclaimer, the term of this patent is extended or adjusted under 35 U.S.C. 154(b) by 239 days.

(21) Appl. No.: 12/902,378

(22) Filed: Oct. 12, 2010

(65) Prior Publication Data

US 2011/0236564 A1   Sep. 29, 2011

(30) Foreign Application Priority Data

Mar. 24, 2010   (KR) .................. 10-2010-0026182

(51) Int. Cl.
*B05D 5/12* (2006.01)
*B05D 1/18* (2006.01)
(52) U.S. Cl. ...................... 427/79; 427/430.1
(58) Field of Classification Search ............ 427/79
See application file for complete search history.

(56) References Cited

U.S. PATENT DOCUMENTS

| 4,997,804 A | * | 3/1991 | Pekala | 502/418 |
| 5,420,168 A | * | 5/1995 | Mayer et al. | 521/99 |
| 2004/0202780 A1 | * | 10/2004 | Morii | 427/115 |
| 2005/0260455 A1 | * | 11/2005 | Xin et al. | 428/702 |
| 2009/0185327 A1 | * | 7/2009 | Seymour | 361/500 |
| 2010/0190639 A1 | * | 7/2010 | Worsley et al. | 502/183 |
| 2010/0272988 A1 | * | 10/2010 | Wu et al. | 428/328 |

* cited by examiner

Primary Examiner — James Lin
Assistant Examiner — Austin Murata
(74) Attorney, Agent, or Firm — Cantor Colburn LLP

(57) ABSTRACT

Provided is a preparation method of a metal oxide doped monolith carbon aerogel for a high capacitance capacitor, the including: preparing a monolith carbon aerogel by performing a thermal decomposition of a moist gel dried in condition of a atmospheric pressure and a room temperature in a nitrogen atmosphere; impregnating the monolith carbon aerogel into alcohol where a metal precursor is dissolved; and calcinating the monolith carbon aerogel where the metal precursor is impregnated in an atmospheric atmosphere. By impregnating the metal oxide into the monolith carbon aerogel, a limit of capacitance may be enhanced using a pseudo capacitance effect by an interfacial oxidation reduction reaction.

4 Claims, 5 Drawing Sheets

(S10)   (S20)   (S30)

PREPARATION METHOD OF METAL OXIDE DOPED MONOLITH CARBON AEROGEL FOR CAPACITANCE CAPACITOR

CROSS-REFERENCE TO RELATED APPLICATION

This application claims the benefit of Korean Patent Application No. 10-2010-0026182, filed on Mar. 24, 2010, in the Korean Intellectual Property Office, the disclosure of which is incorporated herein by reference.

BACKGROUND OF THE INVENTION

1. Field of the Invention

The present invention relates to a preparation method of a metal oxide doped monolith carbon aerogel for a high capacitance capacitor, and more particularly, to a preparation method of a metal oxide doped monolith carbon aerogel for a high capacitance capacitor that may enhance a limit of capacitance may be enhanced using a pseudo capacitance effect by an interfacial oxidation reduction reaction by impregnating the metal oxide into the monolith carbon aerogel.

2. Description of the Related Art

A carbon aerogel corresponds to a mesoporous material and corresponds to a material having an excellent electrochemical characteristic, a relatively wide surface, and an excellent property such as a great porous volume, and the like. In particular, the carbon aerogel may be prepared using a variety schemes depending on a used reactive material. A resorcinol-formaldehyde (RF) scheme of using resorcinol and formaldehyde and preparing the carbon aerogel is most widely used. The carbon aerogel prepared as above may have an excellent electrical property.

The RF scheme may prepare a moist gel by placing resorcinol and formaldehyde together with a catalyst, carbonic acid ($Na_2CO_3$), and stirring them, and then may dry the prepared moist gel. The scheme of drying the moist gel may include a supercritical moist gel dry scheme through the RF scheme. The supercritical moist gel scheme corresponds to a scheme of drying the moist gel in a temperature and a pressure greater than or equal to a critical point of a solvent contained in pores of the moist gel and thereby suppressing a contraction. Here, carbon dioxide needs to be maintained in a supercritical state.

Since carbon dioxide ($CO_2$) needs to be maintained in a supercritical state, a conventional supercritical dry scheme requires a high pressure. Accordingly, manufacturing costs may increase and a riskiness and a discontinuity of a process, and the like may occur.

Also, when preparing an electrode of an electrical double layer capacitor using a material including, as a main component, carbon such as carbon aerosol, the electrical double layer capacitor may have a limit of capacitance due to a weak affinity between a surface and an electrolyte.

SUMMARY OF THE INVENTION

An aspect of the present invention provides a preparation method of a metal oxide doped monolith carbon aerogel for a high capacitance capacitor that may save manufacturing costs, remove a riskiness of a process, and perform a consecutive process by performing a dry process in a condition of a atmospheric pressure and a room temperature.

Another aspect of the present invention also provides a preparation method of a metal oxide doped monolith carbon aerogel for a high capacitance capacitor that may enhance a limit of capacitance using a pseudo capacitance effect by an interfacial oxidation reduction reaction by impregnating the metal oxide into the monolith carbon aerogel.

Another aspect of the present invention also provides a preparation method of a metal oxide doped monolith carbon aerogel for a high capacitance capacitor that may simplify a manufacturing process since it is possible to dip a metal oxide through simple impregnation with respect to a monolith form of carbon aerogel without a separate process.

According to an aspect of the present invention, there is provided a preparation method of a metal oxide doped monolith carbon aerogel for a high capacitance capacitor, wherein a metal precursor is penetrated into a monolith carbon aerogel structure and thereby is doped by impregnating a monolith carbon aerogel in alcohol where the metal precursor is dissolved.

The monolith carbon aerogel may be prepared by performing a thermal decomposition of a moist gel of a circular shape or a cylindrical shape with a diameter of 5 mm to 10 mm in a furnace in a nitrogen atmosphere of 600° C. to 800° C. for about two to 20 hours.

A metal nitrate-based precursor may be used for the metal precursor, and the metal nitrate-based precursor may include at least one mixture of cobalt (Co), titanium (Ti), nickel (Ni), zinc (Zn), iron (Fe), manganese (Mn), and copper (Cu) mixtures.

The metal precursor may include fine particles with a diameter of 20 nm to 200 nm.

The alcohol may correspond to one of ethanol, methanol, propanol, and butanol.

According to another aspect of the present invention, there is provided a preparation method of a metal oxide doped monolith carbon aerogel for a high capacitance capacitor, the comprising: preparing a monolith carbon aerogel by performing a thermal decomposition of a moist gel dried in condition of a atmospheric pressure and a room temperature in a nitrogen atmosphere; impregnating the monolith carbon aerogel into alcohol where a metal precursor is dissolved; and calcinating the monolith carbon aerogel where the metal precursor is impregnated in an atmospheric atmosphere.

In the preparing of the monolith carbon aerogel, the thermal decomposition may be performed in a furnace in a nitrogen atmosphere of 600° C. to 800° C. for about two to 20 hours.

In the preparing of the monolith carbon aerogel, the moist gel may be provided in a circular shape or a cylindrical shape with a diameter of 5 mm to 10 mm.

The preparing of the dried moist gel in the preparing of the monolith carbon aerogel may include: preparing a sol by placing, into a distilled water, carbonic acid($Na_2CO_3$) that is resorcinol and basic catalyst and mixing, and then injecting formaldehyde; preparing the moist gel by gelling the sol in the temperature of 60 to 90° C. for 48 to 80 hours; substituting the distilled water contained in the moist gel with acetone; and drying the moist gel in the atmospheric pressure and the room temperature for 10 to 30 hours and in the temperature of 40 to 80° C. for 10 to 30 hours. In the preparing of the sol, a mol ratio of resorcinol:catalyst is 400 to 600:1, and a mol ratio of resorcinol:formaldehyde is 1:2. In the substituting, the moist gel may be immersed into acetone in the temperature of 40 to 50° C. for 24 hours, and new acetone is substituted every three hour.

In the impregnating, the monolith carbon aerogel may be impregnated into the alcohol where the metal precursor is dissolved, in the temperature of 40 to 70° C. for one to six hours.

In the impregnating, a mol ratio of metal precursor:alcohol may be 0.0005 to 0.005:1.

In the impregnating, the metal precursor may be dissolved in the alcohol and then is ultrasonically distributed for half an hour to one hour.

In the calcinating, the monolith carbon aerogel where the metal precursor may be impregnated is calcinated in the temperature of 200 to 250° C. for three to eight hours.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
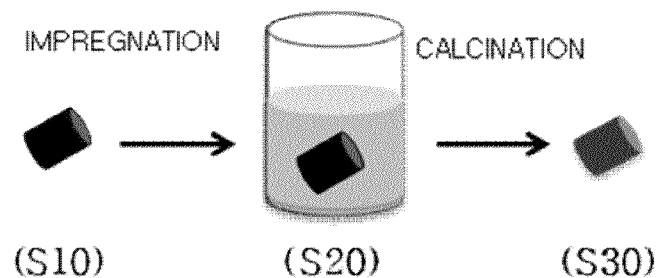
FIG. 1 is a diagram illustrating a preparing a preparation method of a metal oxide doped monolith carbon aerogel for a high capacitance capacitor according to the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a preparation method of a metal oxide doped monolith carbon aerogel for a high capacitance capacitor of the present invention will be described with reference to the accompanying drawings.

As shown in FIG. 1, the preparation method of the metal oxide doped monolith carbon aerogel for the high capacitance capacitor of the present invention may prepare a monolith carbon aerogel by performing a thermal decomposition of a moist gel dried in condition of an atmospheric pressure and a room temperature in a nitrogen atmosphere in operation S10. Here, the monolith carbon aerogel may be prepared by performing a thermal decomposition of the moist gel of a circular shape or a cylindrical shape with a diameter of 5 to 10 mm in 600 to 800° C. in the nitrogen atmosphere. The moist gel used in operation S10 is not limited to a moist gel prepared by an resorcinol-formaldehyde (RF) scheme and thus, a moist gel prepared using another scheme may also be used depending on arbitrary intents.

When manufacturing monolith carbon aerogel using the moist gel prepared using a variety of schemes, it may be desirable to perform the above process in the nitrogen atmosphere as the thermal decomposition condition. It may prevent the moist gel from contacting with the air and thereby being oxidized and all being oxidized into carbon dioxide when increasing the temperature in the atmosphere. When the temperature is less than 600° C. in the thermal decomposition, an impurity content may increase in the monolith carbon aerogel and thereby an electrical conductivity may decrease. When the temperature is greater than 800° C. in the thermal decomposition, a specific surface area of carbon aerogel after the thermal decomposition may significantly decrease and thereby a capacitance decrease. The above tendencies may be prevented.

In the case of the thermal decomposition of the moist gel, the monolith carbon aerogel may be prepared by calcinating the moist gel for 1 to 3 hours in the nitrogen atmosphere at a temperature-up speed of 5° C./min until the temperature becomes 600 to 800° C. More specifically, the thermal decomposition condition corresponds to performing the above process in a furnace of the nitrogen atmosphere in the temperature of 600~800° C. for 2 to 20 hours. Here, a flow rate of nitrogen may be maintained to be 80 to 120 cc/min, the temperature may be raised up at 4 to 6° C./min, and desirably, the flow rate of nitrogen may be maintained to be 100 cc/min and the temperature may be raised up at 5° C./min. In addition, when a diameter of the moist gel is greater than 10 mm, it may be difficult to impregnate a metal precursor into carbon aerogel. When the diameter is less than 5 mm, a processing difficulty may occur in preparing the moist gel due to a small volume.

Figure 2:
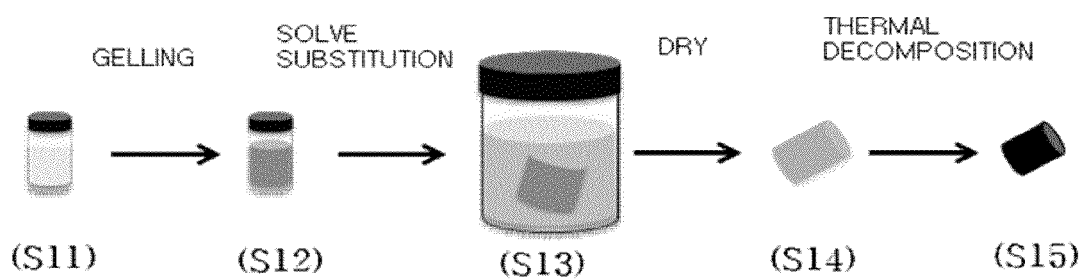
FIG. 2 is a diagram illustrating a detailed diagram of the preparation method of the metal oxide doped monolith carbon aerogel for the high capacitance capacitor of FIG. 1.

As shown in FIG. 2, in operation S11, a sol may be prepared by placing, into a distilled water, carbonic acid ($Na_2CO_3$) that is resorcinol and basic catalyst and mixing, and then injecting formaldehyde. Here, a mol ratio of resorcinol:catalyst may be 400~600:1, and a mob ratio of resorcinol:formaldehyde may be 1:2.

Desirably, the mol ratio of resorcinol:catalyst may be 400 to 600:1. When the mol ratio is greater than 1, particles of aerogel may decrease whereby a specific surface area may significantly decrease. When the mol ratio of the catalyst is less than 1, a combining force between carbon aerogel particles may become weak and thereby a three-dimensional (3D) structure may be easily collapsed during a dry process. Also, it may be most desirable the mol ratio of resorcinol:formaldehyde is 1:2. When the mol ratio of formaldehyde is less than 2, operating points where combination with resorcinol is possible may be two. Accordingly, a supply of formaldehyde required for reaction may be insufficient. When the mol ratio is greater than 2, an effective problem on a reaction path may occur.

In a test example of preparing the above sole, a sample was prepared so that the mol ratio of resorcinol:catalyst may be 400 to 600:1 and the mol ratio of resorcinol:formaldehyde may be 1:2. When the sample was prepared, resorcinol 25.88 g and catalyst 0.04 to 0.06 g were placed into distilled water 33.82 g and the mixture thereof was stirred for about 10 minutes. Next, formaldehyde 40.28 g was placed into the mixture and was stirred for one hour. Through this, sol was prepared.

When the sol is prepared, the moist gel may be prepared by gelling the sol in 60 to 90° C. for 48 to 80 hours in operation S12. Here, the sol may be sealed and be gelled in 60 to 90° C. for 48 to 80 hours. When the temperature is less than 80° C., a relatively high contraction percentage may appear during a atmospheric pressure and a room temperature dry process. When the sol is gelled during a relatively short period of time less than 48 hours, the contraction percentage may increase.

In operation, the distilled water that is a solvent contained in the moist gel may be substituted with acetone in operation S13. The substitution may be performed by dipping the moist gel in acetone in 40 to 50° C. for 24 hours, and by substituting the acetone with new acetone every three hour. To substitute the acetone with new acetone every three hour is to completely substitute the distilled water remaining in the moist gel. To set the temperature of acetone to be less than or equal to 50° C. is to set a temperature closet to a boiling point of acetone. Accordingly, it is possible to more quickly substitute the distilled water remaining in the moist gel with acetone by increasing a dispersion rate of acetone.

When the acetone substitution is completed, a dried moist gel may be prepared by drying the moist gel in a atmospheric pressure and a room temperature for 10 to 30 hours and in 40 to 80° C. for 10 to 30 hours in operation S14. The moist gel substituted with acetone may be dried in the atmospheric pressure and the room temperature for 20 to 30 hours and then may be further dried in 40 to 50° C. for 20 to 30 hours so as to completely remove the acetone remaining within pores of the moist gel. By performing the dry process in the atmospheric pressure and the room temperature, it is possible to save manufacturing costs of metal oxide doped monolith carbon aerogel, to remove a riskiness of a process, and to perform a consecutive process.

When monolith carbon aerogel is prepared by performing thermal decomposition of the dried moist gel, the alcohol where the metal precursor is dissolved, impregnates into the monolith carbon aerogel in operation S20.

The metal precursor used in operation S20 may be fine particular with a diameter of 20 to 200 nm. A metal nitrate-based precursor may be used for the metal precursor. The metal nitrate-based precursor may include at least one mixture of cobalt (Co), titanium (Ti), nickel (Ni), zinc (Zn), iron (Fe), manganese (Mn), and copper (Cu) mixtures. The alcohol may correspond to one of ethanol, methanol, propanol, and butanol.

In operation S20, the alcohol where the metal precursor is dissolved, impregnates into the monolith carbon aerogel, in 40 to 70° C. for one to six [[1~6]] hours. Here, a mol ratio of metal precursor:alcohol may be 0.0005 to 0.005:1. The metal precursor may be dissolved in the alcohol and then be ultrasonically distributed for half an hour to one hour. When the ratio of the metal precursor is greater than or equal to 0.005, a large amount of metal may be oxidized during a calcination process and thereby cause a heat, which the monolith carbon aerogel may be oxidized and be lost. In addition, when the ultrasonic distribution is performed for at least one hour, the monolith carbon aerogel structure may be affected. A reason of impregnating the alcohol where the metal precursor is dissolved in 40 to 70° C. is to increase a dispersion rate of metal precursor dissolved in alcohol.

When the impregnation process is completed, the monolith carbon aerogel with the impregnated metal precursor may be calcinated in operation S30. According to a calcination condition, the metal oxide doped monolith carbon aerogel may be prepared by calcinating the monolith carbon aerogel with the impregnated metal precursor in a temperature of 200 to 250° C. for 3 to 8 hours. The calcination temperature may be set to the temperature of 200 to 250° C. in order to prevent that when the calcination temperature is less than 200° C., a nitrate compound of the metal precursor may not be dissolved and thereby may remain as impurity whereby a capacitance may decrease. By impregnating the monolith carbon aerogel in ethanol where the metal precursor is dissolved to thereby uniformly impregnate the metal oxide, it is possible to enhance a pseudo capacitance effect and to achieve a relatively high capacitance.

Hereinafter, embodiments are proposed for better comprehension. However, the embodiments are only examples and thus, it will be apparent to those skilled in the art that various modifications and changes may be made without departing from the principles and spirit of the invention, the scope of which is defined by the claims and their equivalents.

Embodiment

A monolith carbon aerogel obtained through the thermal decomposition of moist gel was crushed into a powder form. A manganese oxide prepared by perform an impregnation process by setting a mol ratio of manganese precursor:ethanol to be 0.003:1 was calcinated in the temperature of 250° C. for five hours.

Ethanol may have a surface tension of 22 mN/m, and butanol may have a surface tension of 24 mN/m. The surface tension of alcohol may be greater in an order of methanol, ethanol, propanol, and butanol, and the range thereof may be 22 to 24 mN/m. Since the surface tension of ethanol is relatively small, the manganese precursor may be penetrated deep into a pore structure of monolith carbon aerogel having a 3D network structure, and thereby be dipped. Conversely, when an organic solve having a surface tension greater than the surface tension of alcohol, the manganese precursor may not be penetrated deep into the pore structure whereby manganese oxide particles may be crumbled and thus, may not be easily dried.

An electrode was manufactured using the manganese oxide doped monolith carbon aerogel prepared according to the second embodiment.

According to the electrode manufacturing method, an electrode material was prepared by using the manganese oxide doped monolith carbon aerogel prepared is the second embodiment, using a sure P as a conductivity, and using polytetrafluoroethylene (PTFE) as an adhesive. The electrode material was prepared by crushing the manganese oxide doped monolith carbon aerogel was crushed into the power form, and then mixing the same with the conductivity and the adhesive material. An electrode was manufactured by compressing the prepared electrode material to a stainless steel network.

Comparison Example

In the comparison example, moist gel was prepared and pure carbon aerogel prepared using the moist gel was prepared into a power form. Specifically, the manganese oxide doped carbon aerogel was prepared by crushing a dried moist gel into the powder form prior to impregnating the moist gel into alcohol where a metal precursor was dissolved and then performing the impregnation process.

By using the monolith carbon aerogel where manganese oxide is doped, prepared according to the comparison example, an electrode was manufacturing according to the embodiment.

Figure 3:
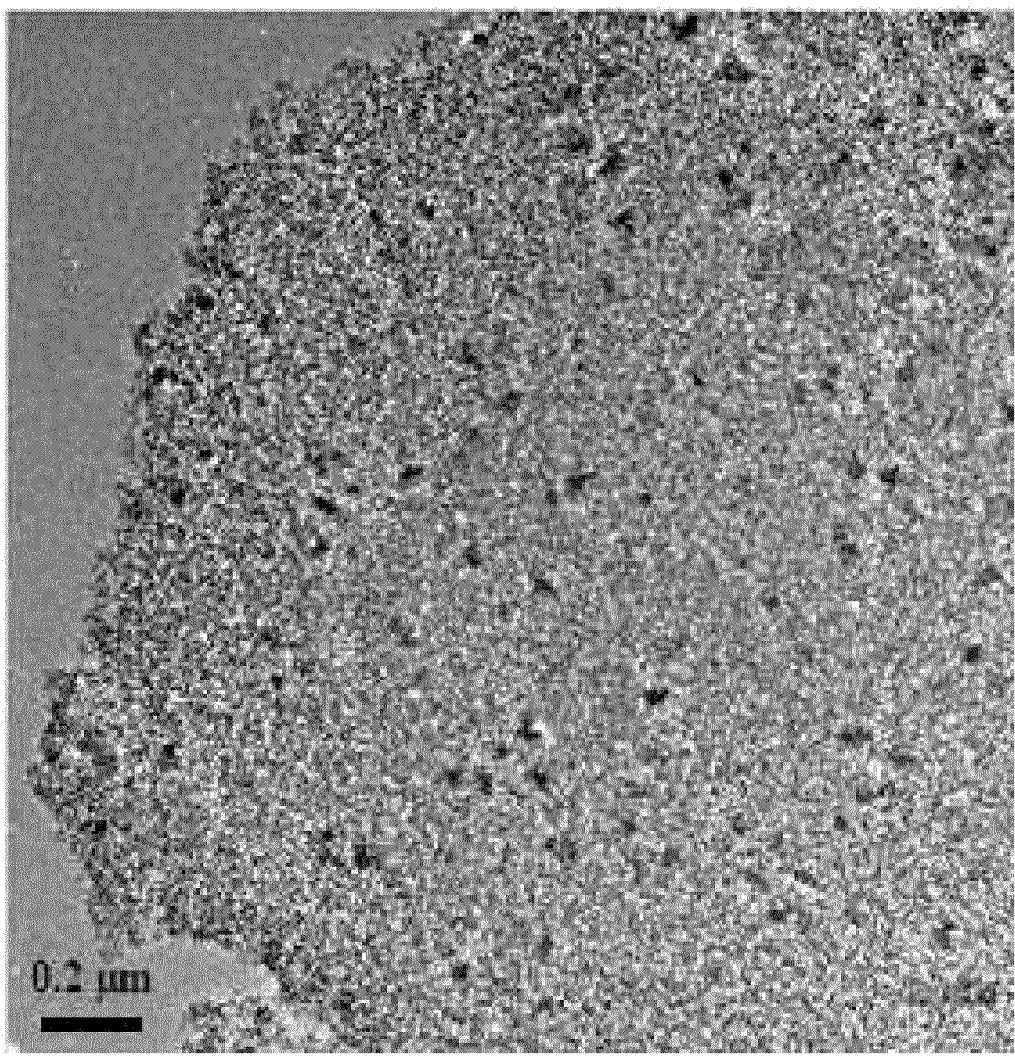
FIG. 3 is a transmission electron microscope picture of a manganese oxide doped monolith carbon aerogel for a high capacitance capacitor according to the embodiment of the present invention.
Figure 4:
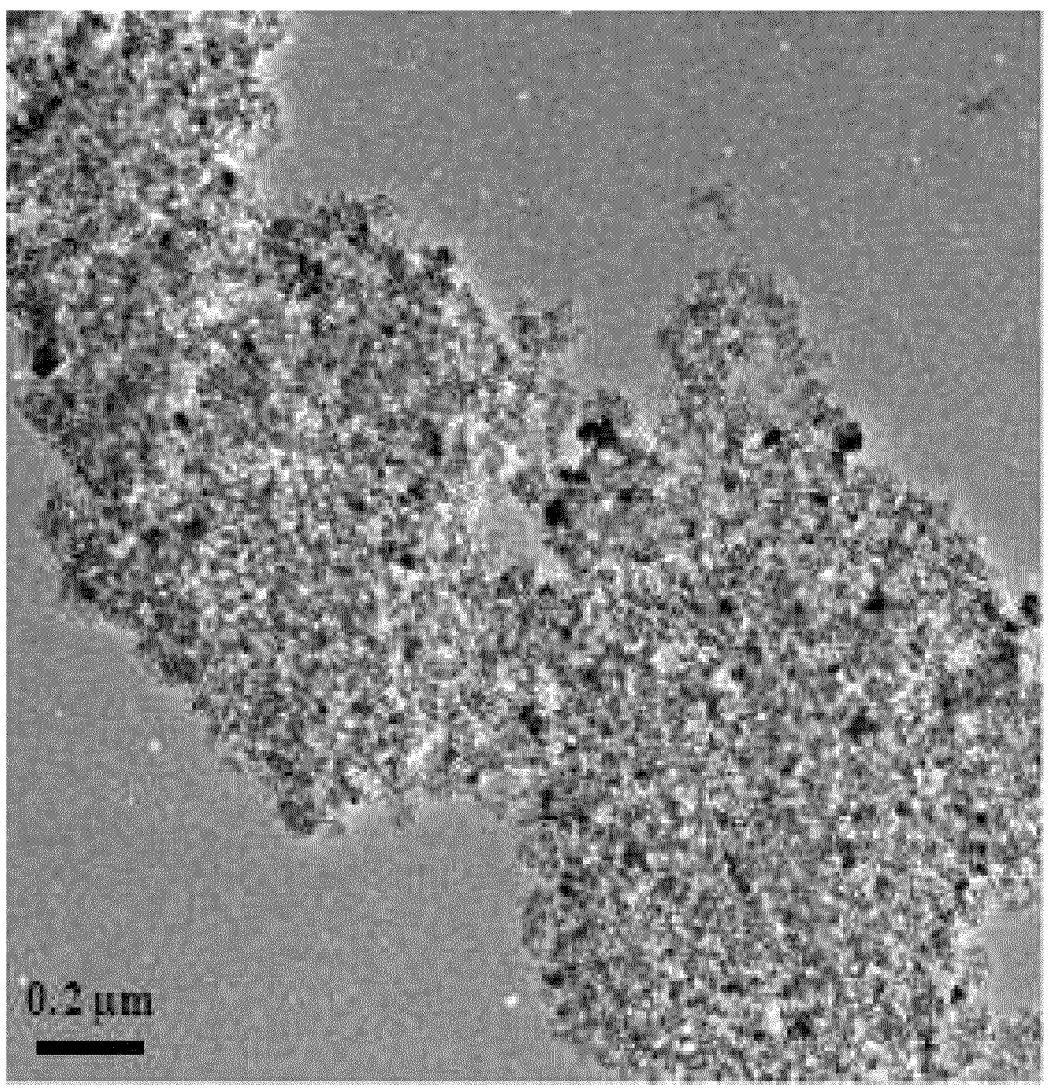
FIG. 4 is a transmission electron microscope picture of a manganese oxide doped carbon aerogel according to comparison example.
Figure 5:
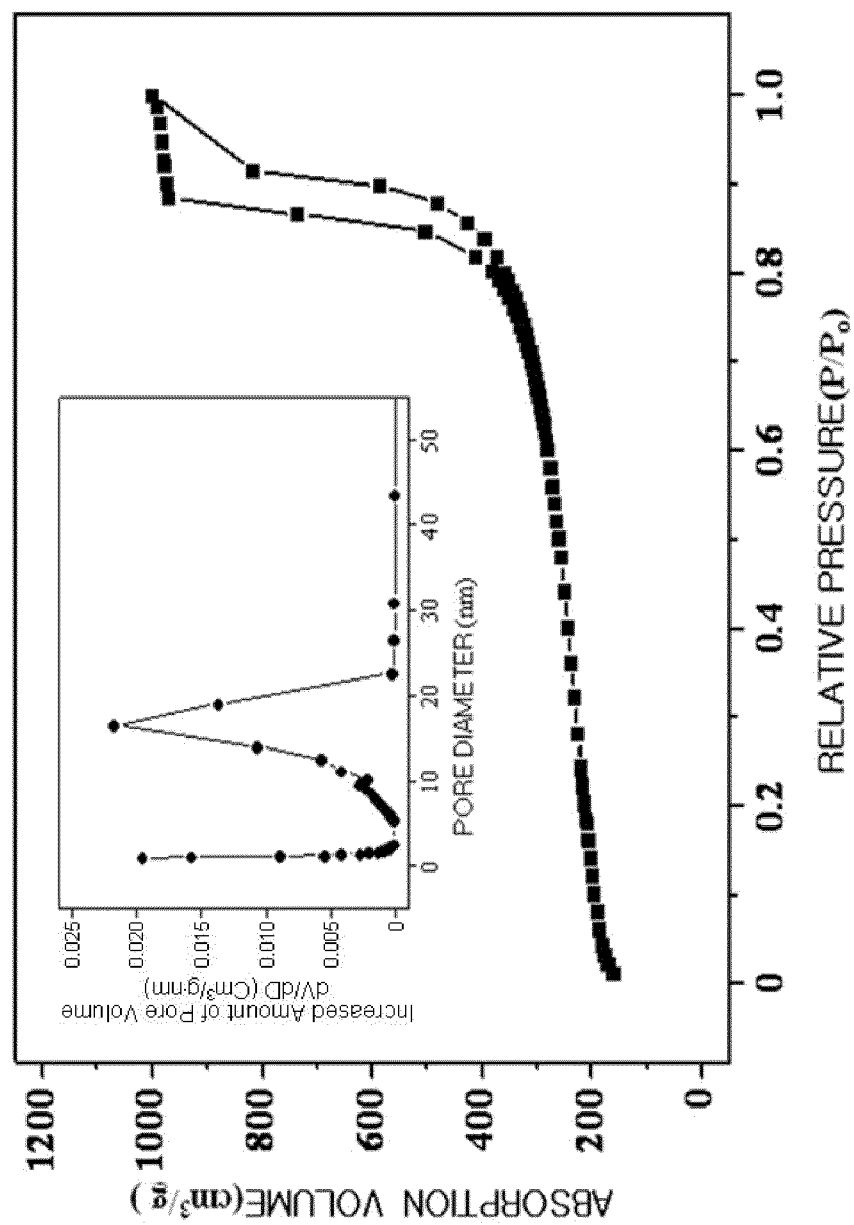
FIG. 5 is a graph illustrating a nitrogen absorption-desorption isotherm and a porous size distribution of the cobalt oxide doped monolith carbon aerogel for the high capacitance capacitor according to the embodiment of the present invention.

To compare the manganese oxide doped carbon aerogel prepared according to the comparison example with the manganese oxide doped monolith carbon aerogel manufactured according to the embodiment of the present invention, of which results are shown in FIG. 3, FIG. 4 and FIG. 5.

FIG. 3 is a transmission electron microscope picture of a manganese oxide doped monolith carbon aerogel according to the embodiment of the present invention, and FIG. 4 is a transmission electron microscope picture of a manganese oxide doped carbon aerogel according to comparison example.

As shown in the transmission electron microscope picture of FIG. 3, manganese oxide indicated as black dots is uniformly dipped in a similar size and distribution in the manganese oxide doped monolith carbon aerogel according to the embodiment of the present invention. On the other hand, it can be seen from the transmission electron microscope picture of FIG. 4 that manganese oxide indicated as black dots is undistributedly and un-uniformly dipped in the manganese oxide doped carbon aerogel according to comparison example.

According to the above result, when manganese precursor is placed in a carbon aerogel of a powder form, a partial manganese precursor is condensed while being dipped outside the carbon aerogel. On the other hand, when calcination is performed after drying a moist gel and immediately performing an impregnation process and then performing a calcination according to the present invention, the metal precursor penetrated into an internal porous structure of monolith carbon aerogel may be dipped into the carbon aerogel with the uniform size and distribution while being calcinated. The above difference between dipping schemes may affect the distribution of manganese oxide.

FIG. 5 is a graph illustrating a nitrogen absorption-desorption isotherm and a porous size distribution of the cobalt oxide doped monolith carbon aerogel for the high capacitance capacitor according to the embodiment of the present invention. Here, ASAP 2010 (manufacturer: Micromeritics) was employed. As shown in the isotherm of FIG. 5, the monolith carbon aerogel prepared through the atmospheric pressure and the room temperature dry proposed according to the present invention was prepared using a mesoporous material. As shown in the pore size distribution, pores with the diameter of 10 to 20 nm were developed. Other physical properties may be verified from the following Table 1:

TABLE 1

| Specific surface area (m$^2$/g) | Microporous area (m$^2$/g) | Mesoporous area (m$^2$/g) | Average pore diameter (nm) | Porosity (%) |
|---|---|---|---|---|
| 706 | 344 | 360 | 10.9 | 77.9 |

An electrochemical characteristic was measured by applying the same scheme to the electrode manufactured from the embodiment and the electrode manufactured from the comparison example. In the electrochemical characteristic, an electrode performance was measured using PGSTAT 302N (manufacturer: AUTOLAB), which is a three electrode system, in a potassium hydroxide aqueous solution of 6 mol concentration, of which the result is shown in FIG. 6.

Figure 6:
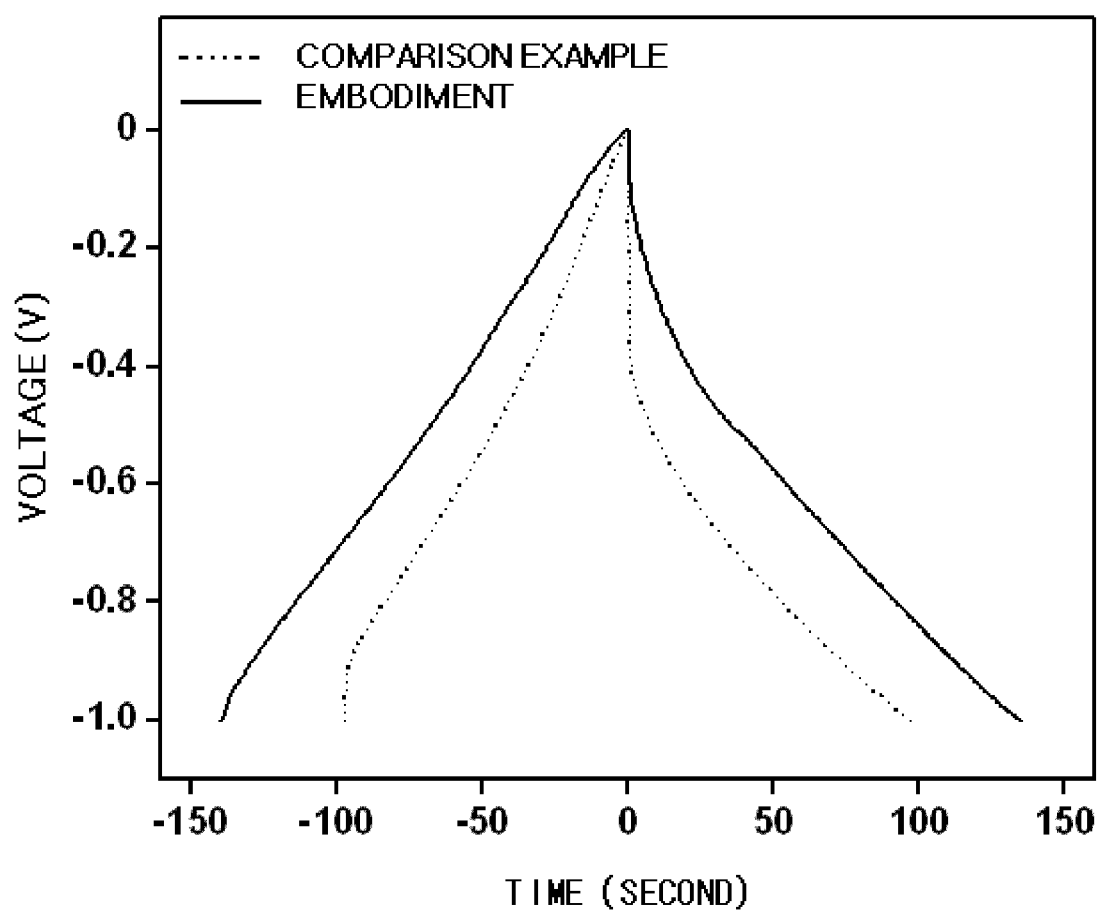
FIG. 6 is a graph illustrating a constant current charge/discharge characteristic of a manganese oxide doped monolith carbon aerogel for a high capacitance capacitor according to the embodiment of the present invention.

FIG. 6 is a graph illustrating a constant current charge/discharge characteristic of an manganese oxide doped monolith carbon aerogel for a high capacitance capacitor according to the embodiment of the present invention. In FIG. 6, a characteristic curve indicated by a solid line shows a constant current (1 A/g) charge/discharge characteristic result of the electrode manufactured according to the embodiment, by dipping the manganese oxide in the monolith carbon aerogel, and a characteristic curve indicated by a dotted line shows a constant current (1 A/g) charge/discharge characteristic result of the electrode manufactured according to the comparison example. As shown in FIG. 6, the electrode manufactured according to the embodiment shows a capacitance greater than the electrode manufactured according to the comparison example. It can be regarded that a limit of an electrical dual layer capacitor has been overcome with a pseudo capacitance effect by dipping the manganese oxide in monolith carbon aerogel.

When manufacturing an electrode using the manganese oxide doped monolith carbon aerogel of the present invention, it is possible to enhance a limit of capacitance using a pseudo capacitance effect by an interfacial oxidation reduction reaction using a metal oxide doped monolith carbon aerogel. A preparation method of the metal oxide doped monolith carbon aerogel may be simplified by dipping a metal oxide through simple impregnation with respect to a monolith form of carbon aerogel without a separate process. Accordingly, when applying the preparation method of the present invention to an electrode or high capacitance capacitor manufacturing field, it is possible to enhance a productivity, to save costs, and the like.

What is claimed is:

1. A preparation method of a metal oxide doped monolith carbon aerogel for a high capacitance capacitor, comprising:
preparing a monolith carbon aerogel by performing a thermal decomposition of a moist gel dried in condition of a high pressure in a nitrogen atmosphere,
wherein the moist gel is provided in a circular shape or a cylindrical shape with a diameter of 5 mm to 10 mm,
wherein a step for preparing a monolith carbon comprises:
preparing a sol by placing, into a distilled water, carbonic acid(Na2CO3) that is resorcinol and basic catalyst and mixing, and then injecting formaldehyde,
preparing the moist gel by gelling the sol in a temperature of 60 to 90° C. for 48 to 80 hours, substituting the distilled water contained in the moist gel with acetone,
and drying the moist gel in an atmospheric pressure and a room temperature for 10 to 30 hours and in a temperature of 40 to 80° C. for 10 to 30 hours,
wherein in the preparing of the sol, a mol ratio of resorcinol:catalyst is 400 to 600:1, and a mol ratio of resorcinol:formaldehyde is 1:2, wherein the moist gel in the substituting is immersed into acetone in a temperature of 40 to 50° C. for 24 hours, and new acetone is substituted every three hour;
impregnating an alcohol, where a metal precursor is dissolved, into the monolith carbon aerogel,
wherein the monolith carbon aerogel is impregnated with the alcohol where the metal precursor is dissolved, in the temperature of 40 to 70° C. for one to six hours, wherein a mol ratio of metal precursor:alcohol is 0.0005 to 0.005:1; and
calcinating the monolith carbon aerogel where the metal precursor is impregnated in an atmospheric atmosphere.

2. The method of claim 1, wherein in the preparing of the monolith carbon aerogel, the thermal decomposition is performed in a furnace in a nitrogen atmosphere of 600° C. to 800° C. for about two to 20 hours.

3. The method of claim 1, wherein in the impregnating, the metal precursor is dissolved in the alcohol and then is ultrasonically distributed for half an hour to one hour.

4. The method of claim 1, wherein in the calcinating, the monolith carbon aerogel where the metal precursor is impregnated is calcinated in the temperature of 200 to 250° C. for three to eight hours.

* * * * *